(12) United States Patent
Lyon et al.

(10) Patent No.: US 9,021,110 B2
(45) Date of Patent: Apr. 28, 2015

(54) CONSISTENT ASSOCIATION OF A USER ID WITH A USER

(75) Inventors: Clifford Lyon, Melrose, MA (US); Ron Rothman, Ringoes, NJ (US)

(73) Assignee: CBS Interactive, Inc., New York, NY (US)

( * ) Notice: Subject to any disclaimer, the term of this patent is extended or adjusted under 35 U.S.C. 154(b) by 327 days.

(21) Appl. No.: 13/485,122

(22) Filed: May 31, 2012

(65) Prior Publication Data
US 2013/0326037 A1 Dec. 5, 2013

(51) Int. Cl.
*G06F 15/16* (2006.01)
*G06F 17/30* (2006.01)

(52) U.S. Cl.
CPC .................................. *G06F 17/30902* (2013.01)

(58) Field of Classification Search
USPC .................................................. 709/223–229
See application file for complete search history.

(56) References Cited

U.S. PATENT DOCUMENTS

| | | | |
|---|---|---|---|
| 7,533,260 B2 * | 5/2009 | Dharmarajan | ................ 713/162 |
| 7,974,868 B2 | 7/2011 | Tseng et al. | |
| 8,185,608 B1 | 5/2012 | York et al. | |
| 8,234,166 B2 | 7/2012 | Filice et al. | |
| 2008/0263627 A1 | 10/2008 | Berteau et al. | |
| 2009/0063250 A1 | 3/2009 | Burgess et al. | |
| 2011/0231821 A1 | 9/2011 | Sahni et al. | |
| 2012/0016836 A1 | 1/2012 | Fender et al. | |
| 2012/0303552 A1 | 11/2012 | Zayas et al. | |

* cited by examiner

*Primary Examiner* — Ebrahim Golabbakhsh
(74) *Attorney, Agent, or Firm* — Kacvinsky Daisak Bluni PLLC

(57) ABSTRACT

Disclosed herein are systems, methods, and computer-readable storage media for consistently associating a user ID with a user. In one aspect, a method may comprise receiving a data request at a transceiver accessible by a server computing device, wherein, in response to receiving the data request, the server computing device is configured to: access, by one or more processors coupled to the transceiver, a first value embedded in a first cookie associated with a first expiration time; set a second cookie embedded with a second value; and reset the first cookie responsive to receiving an indication that the first cookie is expiring, wherein to reset the first cookie comprises replacing the first cookie with a third cookie set with a value equal to the first value and a third expiration time later than the first expiration time. Other embodiments are disclosed and claimed.

35 Claims, 6 Drawing Sheets

CONSISTENT ASSOCIATION OF A USER ID WITH A USER

CROSS-REFERENCE TO RELATED APPLICATION

This application is related to U.S. patent application Ser. No. 13/287,827, filed Nov. 2, 2011 and entitled SCHEDULED SPLIT TESTING, the disclosure of which is incorporated herein by reference in its entirety.

BACKGROUND

1. Technical Field

The present disclosure relates to identifying website users and, more specifically, to consistently assigning a website user with a user identification (ID) utilizing web cookies.

2. Introduction

Websites often assign user IDs to visitors and typically store each visitor's user ID in a persistent cookie in the visitor's browser. This user ID may be used in numerous ways to enhance the user's experience on the site, for example, to personalize the presentation of content or to enhance the web publisher's tracking and reporting capabilities. All persistent cookies expire, and if a user ID cookie expires mid-session, while the visitor is actively engaging with the site, that user may experience confusing or unattractive content. For example, while conducting a test of different page layouts, certain users may have been randomly selected to view a particular page layout. The specific layout ID may be stored in a cookie for each particular user. When rendering a web page, the cookie may be used to indicate the layout that should be shown to this user. If the cookie were to expire either between visits or during a visit, the user might be assigned to view another layout, resulting in a potentially confusing "flip" from one layout to another.

Content publishers have attempted to remedy such situations with existing technology, for example, by continually re-setting the cookie with a new expiration date on every response from the web server. However, the continual re-setting of cookies introduces certain inefficiencies and overhead into the website operation, such as the addition of unnecessary web traffic in each of the site's responses to user requests. Another solution involves setting the cookie's expiration date to a distant future date, for instance, ten years from the current date. These methods do not provide a satisfactory solution in all cases. As such, there may be a need for improved methods of persisting cookies, for example, in support of providing consistent user experiences.

SUMMARY

Disclosed herein are systems, methods, devices, and non-transitory computer-readable storage media for consistently associating a user ID with a website visitor over a series of visits to a website. A user ID may be associated with a user so that every time the user visits a website, or navigates among pages within the website, the user may be treated consistently. For example, a user enrolled in a test being conducted at a particular website and shown a specific variation of the website may be provided with the same variation upon subsequent visits to the website. In another example, a user browsing a news content website may be presented with certain advertising consistent with previous browsing patterns.

In certain embodiments, a user ID may be embedded in a file, for example, a cookie, stored on a user device accessing the website to consistently identify the user upon each visit. In one embodiment, the user ID may be stored in a persistent cookie, which may be associated with an expiration time. According to existing technology, when a persistent cookie expires, a user may be treated inconsistently upon a subsequent visit or even during a single session. Accordingly, embodiments may operate to consistently treat users, inter alia, using a combination of session cookie values and persistent cookie values to identify a user over multiple sessions. Session cookies expire when a user terminates the client application. Setting a user ID in both a persistent cookie and a session cookie according to embodiments, the user ID stored in the session cookie may be used to reset the persistent cookie responsive to an indication that the persistent cookie has expired or may expire at a future time.

A persistent cookie may be determined to be expiring in multiple ways. For instance, according to certain embodiments, failure to send a persistent cookie with a website request may indicate that the persistent cookie is expiring or has expired. In response to an indication that a persistent cookie is expiring, embodiments provide that the user ID from a session cookie may be used to reset the persistent cookie. In one embodiment, a session cookie sent as a result of a content request may be utilized as an indication that the persistent cookie is expiring, such that the persistent cookie may be reset responsive to a successful return of a session cookie.

In certain embodiments, two persistent cookies may be used to associate the same user ID to a user upon subsequent visits. For example, a first persistent cookie may be embedded with the user ID and associated with an expiration time, and a second persistent cookie may be embedded with a value indicative of the expiration time associated with the first persistent cookie. As such, the expiration time of the first persistent cookie may be determined through the second persistent cookie. The retrieved expiration time may be used to determine whether the first persistent cookie is expiring and, if so, the first persistent cookie may be reset.

The foregoing is a summary and, as such, may contain simplifications, generalizations, and omissions of detail. Those skilled in the art will appreciate that the summary is illustrative only and is not intended to be in any way limiting. For a better understanding of the embodiments, additional features and advantages thereof will be set forth in the description which follows, taken in conjunction with the accompanying drawings, and in part will be obvious from the description, or can be learned by practice of the embodiments disclosed therein. The scope of the invention will be pointed out in the appended claims.

DETAILED DESCRIPTION

Various example embodiments are discussed in the following more detailed description, as represented in the figures, which is not intended to limit the scope of the claims, but is merely representative of those embodiments. While specific embodiments are discussed, it should be understood that this is done for illustrative purposes only. A person having ordinary skill in the relevant art will recognize that other components and configurations may be used without parting from the spirit and scope of the detailed description of example embodiments provided herein.

Embodiments as provided herein may be applied in many situations common to web publishing. For example, a website may run tests in which different groups of users are assigned to see different content. During such tests, the user's ID and/or any associated data are typically stored in a set of cookies. If the cookie expires, the test may be invalidated and the user may have a negative site experience. Accordingly, certain embodiments may operate to prevent such cookies from expiring.

Figure 1:
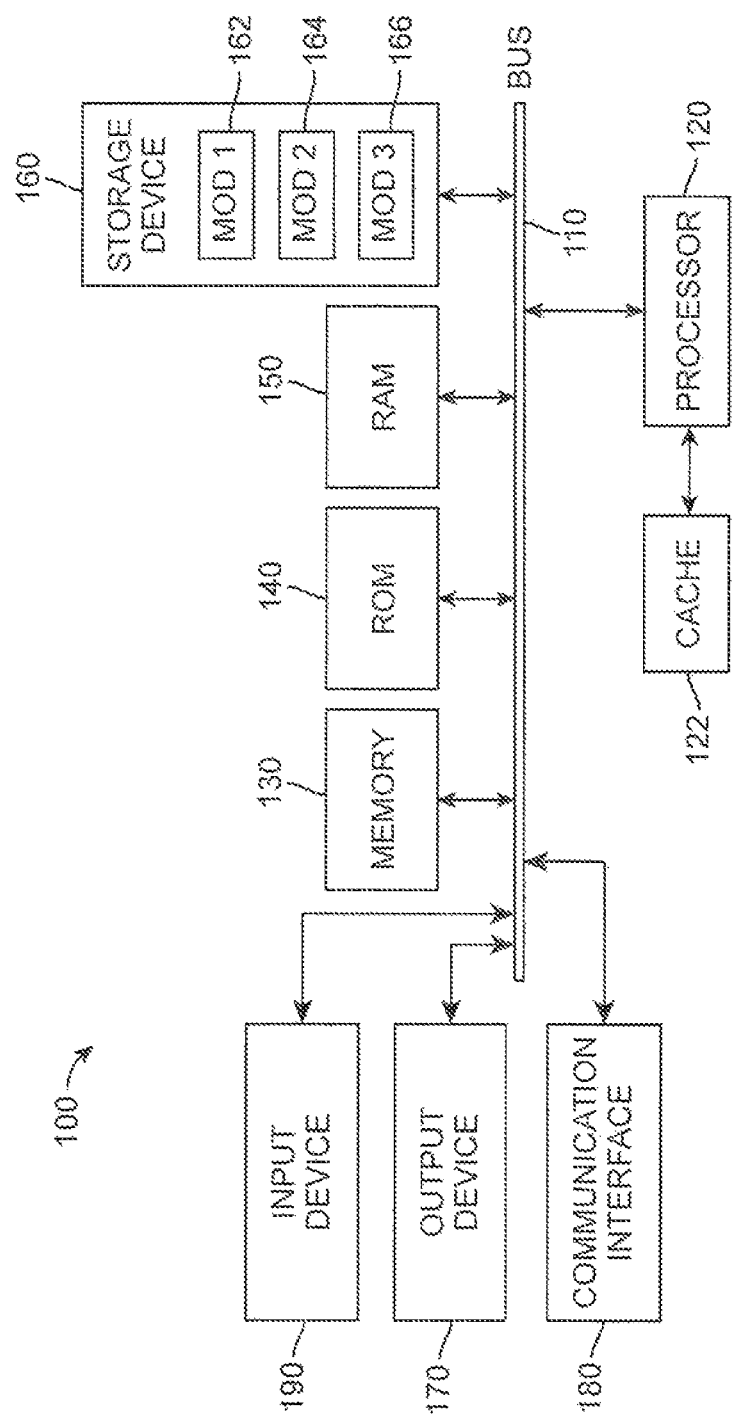
FIG. 1 illustrates an exemplary system embodiment.

FIG. 1 illustrates an exemplary system 100 that includes a general-purpose computing device 100, including a processing unit (CPU or processor) 120 and a system bus 110 that couples various system components, including the system memory 130, such as read only memory (ROM) 140 and random access memory (RAM) 150, to the processor 120. The system 100 can include a cache 122 of high speed memory connected directly with, in close proximity to, or integrated as part of the processor 120. The system 100 may copy data from the memory 130 and/or the storage device 160 to the cache 122 for quick access by the processor 120. In this way, the cache 122 may provide a performance boost that avoids processor 120 delays while waiting for data. These and other modules may control or be configured to control the processor 120 to perform various actions. Other system memory 130 may also be available for use within the computing device 100. The memory 130 may include multiple different types of memory with different performance characteristics. It can be appreciated that these principles may operate on a computing device 100 with more than one processor 120 or on a group or cluster of computing devices networked together to provide greater processing capability. The processor 120 may include any general purpose processor and a hardware module or software module, such as module 1 162, module 2 164, and module 3 166 stored in storage device 160, configured to control the processor 120 as well as a special-purpose processor, for example where software instructions may be incorporated into the actual processor design. The processor 120 may essentially be a completely self-contained computing system, containing multiple cores or processors (including symmetric or asymmetric multi-core processors), a bus, memory controller, cache, etc.

The system bus 110 may be any of several types of bus structures, including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 may further include storage devices 160 such as a hard disk drive, a magnetic disk drive, an optical disk drive, tape drive, or the like. The storage device 160 may include software modules 162, 164, 166 for controlling the processor 120. Other hardware or software modules are contemplated herein. The storage device 160 may be connected to the system bus 110 by a drive interface. The drives and the associated computer readable storage media may provide non-volatile storage of computer readable instructions, data structures, program modules, and other data for the computing device 100. In one aspect, a hardware module that performs a particular function may include a software component stored in a non-transitory computer-readable medium in connection with the necessary hardware components, such as the processor 120, bus 110, display 170, and so forth, to carry out the function. The basic components are known to those of skill in the art and appropriate variations are contemplated herein, for example, depending on the type of device, such as whether the device 100 is a small, handheld computing device, a desktop computer, a computer server, or other form of information handling device.

Although the exemplary embodiment described in FIG. 1 employs a hard disk 160, it should be appreciated by those skilled in the art that other types of non-transitory computer readable storage media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 may be utilized which represents any number of input mechanisms, such as a microphone for speech, a touch-sensitive screen for gesture or graphical input, keyboard, mouse, motion input, speech and so forth. An output device 170 may also be one or more of a number of output mechanisms known to those having ordinary skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment of FIG. 1 is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors (the term "processor" should not be construed to refer exclusively to hardware capable of executing software) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments may be implemented as follows: (1) a sequence of computer implemented steps, operations, or procedures running on a programmable circuit within a general use computer; (2) a sequence of computer implemented steps, operations, or procedures running on a specific-use programmable circuit; and/ or (3) interconnected machine modules or program engines within the programmable circuits. The system 100 shown in FIG. 1 may practice all or part of the recited methods, may be a part of the recited systems, and/or may operate according to instructions in the recited non-transitory computer-readable storage media. Such logical operations may be implemented as modules configured to control the processor 120 to perform particular functions according to the programming of the module. For example, FIG. 1 illustrates three modules Mod1 162, Mod2 164, and Mod3 166, which are modules configured to control the processor 120. These modules may be stored on the storage device 160 and loaded into RAM 150 or memory 130 at runtime, or may be stored as would be known in the art in other computer-readable memory locations.

Figure 2:
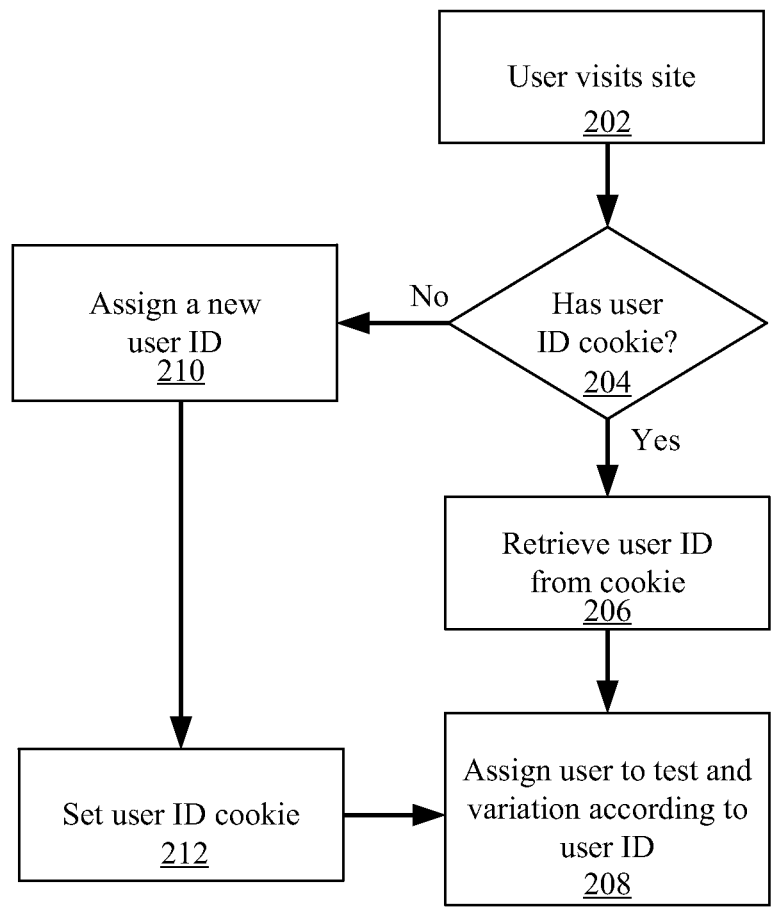
FIG. 2 illustrates an exemplary method embodiment for scheduling users into testing groups utilizing cookies.

FIG. 2 illustrates an exemplary method embodiment for scheduling users into testing groups utilizing cookies. As shown in FIG. 2, a user may visit a website 202 resulting in a determination of whether the user has an ID cookie 204. If the user has an ID cookie 204, then the user ID may be retrieved from the cookie 206 and the user may be assigned to a test and a variation according to the user ID 208. If the user does not have an ID cookie 204, then the user may be assigned a new ID 210 and the ID cookie set with the new ID 212. The user may then be assigned to a test and a variation according to the user ID 208.

Figure 3:
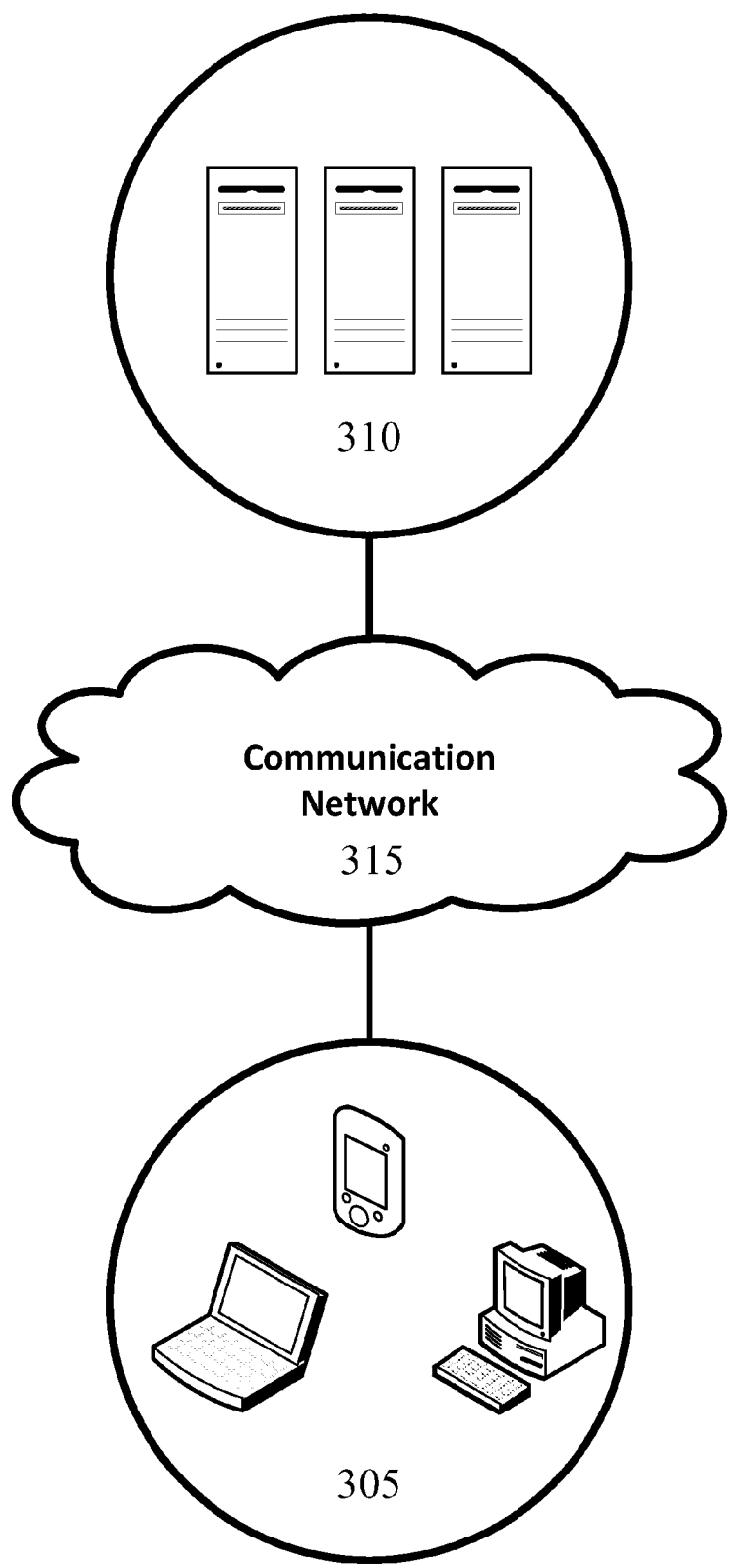
FIG. 3 illustrates an exemplary system embodiment in which cookies may be used to consistently associate a user ID with a website visitor.

As described herein, embodiments may be configured to treat a user consistently upon each visit to a website. To consistently handle a user upon each visit to a website, a user may be consistently associated with the same user ID. As explained hereinabove, the user ID may be embedded in a cookie stored on a user device and used to consistently identify the user upon each visit. Referring to FIG. 3, therein is provided an exemplary embodiment of a system in which cookies may be used to consistently associate the same user ID with a user each time the user visits a web site.

As shown in FIG. 3, user devices 305 may be configured to communicate with web servers 310 via one or more communication networks 315. A user device 305 may be any type of computing device or other information handling device configured to communicate with other devices, such as a web server 310, via a communication network. Non-limiting examples of user devices 305 may include a personal computer (PC), laptop, tablet computing device, smart phone, kiosk, e-reader, and personal digital assistant (PDA). A user device 305 may execute a web browser application or other application configured to interface with the web server and request, retrieve, and present information provided by a web server. In general, a user device 305 is configured to have at least some minimal amount of storage or at least have access to storage, for example, in order to store cookies or other data that uniquely identifies the user and/or user device.

A web server 310 may be a computing device similar to the device disclosed in FIG. 1, and may additionally be configured to host a website. For example, a web server 310 may be configured to communicate with a user device 305 via the communication network 315 wherein the web server 310 may receive a request for web data from the user device 305 and may respond by transmitting the requested web data to the user device 305. Web data may be any type of data that may be used by the user device 305 to render a webpage, such as, for example, a markup language such as the hyper-text markup language (HTML) or the extensible markup language (XML). The web data may be transmitted from the one or more web servers 310 to the user device 305. For example, a user may enter a webpage uniform resource locator (URL) into the web browser running on user device 305 and the web browser may be configured to request the content from the appropriate web server 310. A similar request may be sent upon the user choosing to navigate to a different page or site on the Internet or World Wide Web.

When a user device 305 requests web data from a web server 310 for the first time, a user ID may be assigned to the user by the web server 310. In one embodiment, the user ID may be embedded in a cookie and stored on the user device 305 so that when the user device 305 transmits further requests to the web server 310 resulting from, for example, the user navigating to different pages within the site, refreshing the page, or returning to the site after leaving, the user device 305 may transmit the cookie to a web server 310, for example, in a request header, and the web server 310 may extract the user ID from the cookie. The user ID may be tied to a particular device, user, account, browser, platform, or combinations thereof. For example, a user ID associated with a particular account may be stored in different cookies for different browsers on one or more computers, such that the same test is applied to the user's experience in different locations or when using different computing devices. Furthermore, multiple different cookies may exist for different users, such that two users who share the same browser on the same computer, but log into a site as different users, may be treated differently when logging in as each respective user.

The user ID may be stored in a persistent cookie according to embodiments, for example, on the user device 305 or on some other local or locally accessible storage. A persistent cookie may be a cookie associated with an expiration time such that the cookie may be configured to be returned to the web server 310 upon request until the expiration time has passed. When a user returns to a site prior to the expiration of the persistent cookie, the user device 305 may send the cookie to the web server 310, for example, when transmitting a request. The web server 310 may obtain the cookie and extract the user ID embedded therein. If the cookie expires (i.e., the expiration time has passed) during a visit or between visits, the user device 305 will no longer send the cookie with its requests, and the user may be assigned a different user ID, potentially being treated inconsistently with respect to the first part of the visit or previous visits. A client-side tool may identify, display, and otherwise manage these cookies on behalf of the user. Cookie management may include renewing a cookie, deleting a cookie, modifying a cookie, moving a cookie, duplicating a cookie, moving a cookie from one device or browser to another device or browser, and so forth. Alternately, a web-based tool may receive any cookies set in its domain, parse them to extract data, display that data to users, and provide similar functionality. The user ID may be stored in a cookie; however, embodiments are not so limited, as the user ID may also be stored via some other storage mechanism or container.

To avoid possible inconsistent treatment resulting from a persistent cookie expiring, embodiments provide that a session cookie may be used in conjunction with a persistent cookie. In general, a session cookie is a cookie which will be deleted after the user closes the browser handling the session. For instance, in a HTTP configuration, a session cookie does not have an expiration date set in the Set-Cookie response header from the server (e.g., web server 310).

The session cookie may be used to store the user ID so that if the persistent cookie expires in the middle of a user session, the web server 310 may still retrieve the user ID from the session cookie. The web server may also use the user ID retrieved from the session cookie to reset the persistent cookie on the user device. According to embodiments, resetting the persistent cookie may include embedding the user ID into a new persistent cookie, for example, embedded with a different expiration time, which may be stored on the user device 305, or by changing the expiration time associated with the persistent cookie to a later time.

Figure 4:
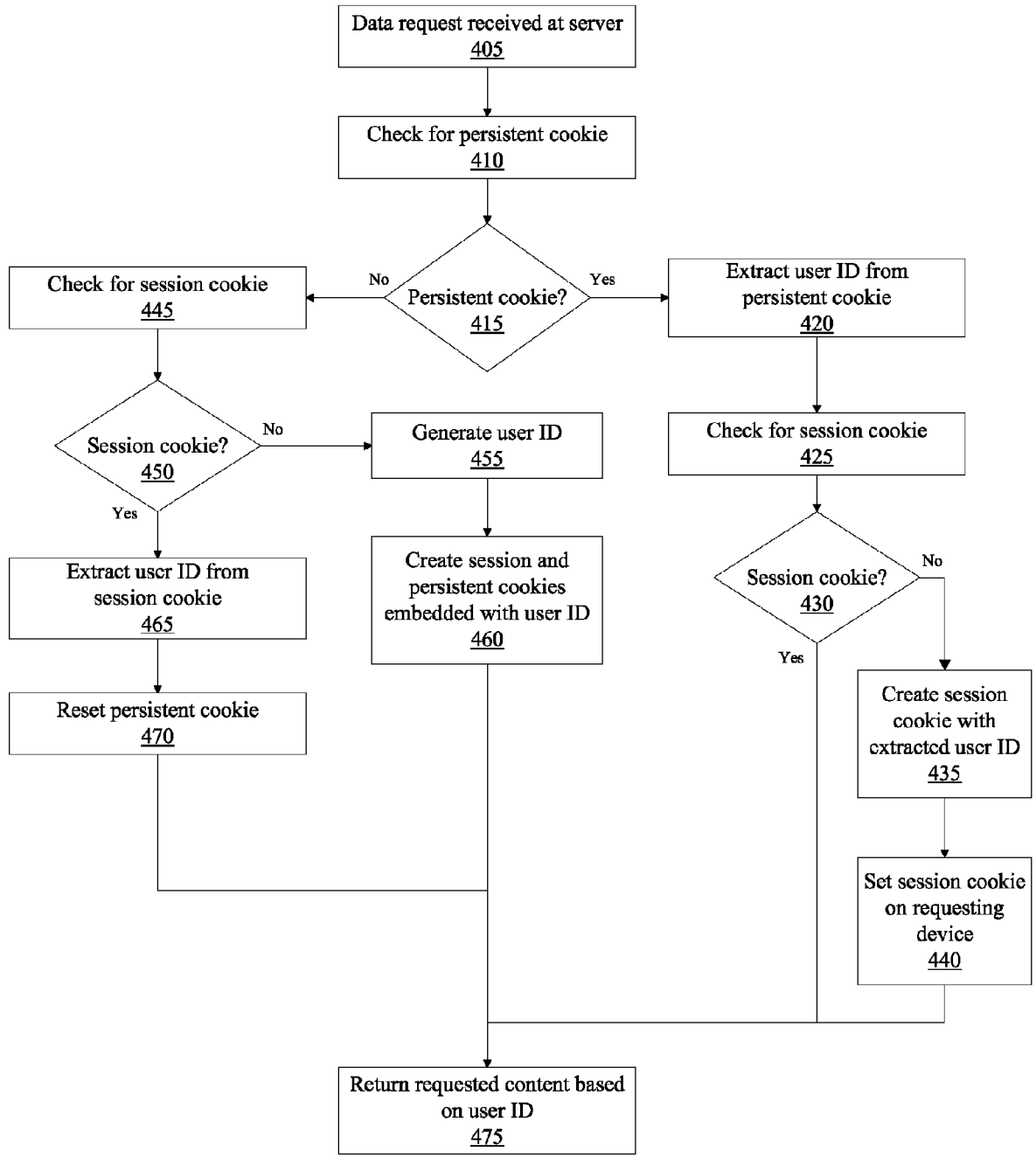
FIG. 4 illustrates an exemplary method embodiment for storing a user ID utilizing a persistent cookie and session cookie.

FIG. 4 illustrates an exemplary method embodiment of using a persistent cookie and session cookie to store a user ID. As illustrated, a web server may receive a request from a user device for web data stored on the web server 405, and the web server may check whether the request contains a persistent cookie 410. The web server may, for example, use a naming convention to distinguish between persistent and session cookies relevant to the testing system. If the request contains a persistent cookie 415, the embedded user ID may be extracted 420. The web server may check whether the request contains a session cookie 425. If the request does not contain a session cookie 430, a session cookie may be created and embedded with the user ID extracted from the persistent cookie 435 and the session cookie may be set on the requesting user device 440. The user ID may be used to return the proper web data to the user device 475 in response to the initially received request. If the request contains a session cookie 430, the requested web data may be returned 475 based on the user ID value.

If the request does not contain a persistent cookie 415, the web server may check whether the request contains a session cookie 445. If the request contains a session cookie 450, for example, when the persistent cookie has expired during a user session, the user ID may be extracted from the session cookie 465 and may be used to reset the persistent cookie 470 on the user device. The user ID may be used to return the appropriate web data to the user device 475 in response to the request from the user device.

If the request does not contain a session cookie 450, a user ID may be generated 455 and embedded into both a session cookie and a persistent cookie 460, which may be stored on the user device. The generated user ID is then used to return the appropriate data to the user device 475.

The example embodiment provided in FIG. 4 may use session cookies to associate the same user ID with a user, for instance, when the persistent cookie expires during a user session. A persistent cookie, however, can also expire while a user is not in a session. In this type of scenario, neither a persistent nor a session cookie will be transmitted to the web server, and thus the user may be assigned a new user ID and possibly treated inconsistently from previous visits. In one embodiment, the persistent cookie may be reset every time a session cookie is returned. For example, resetting the persistent cookie may consist of changing the expiration associated with the persistent cookie to a later time. As such, the persistent cookie expiration may be consistently set at a certain increment from the time it is being set. In this embodiment, a user may be associated with the user ID embedded in the persistent cookie for at least the increment of time chosen from their last visit to the site.

Figure 5:
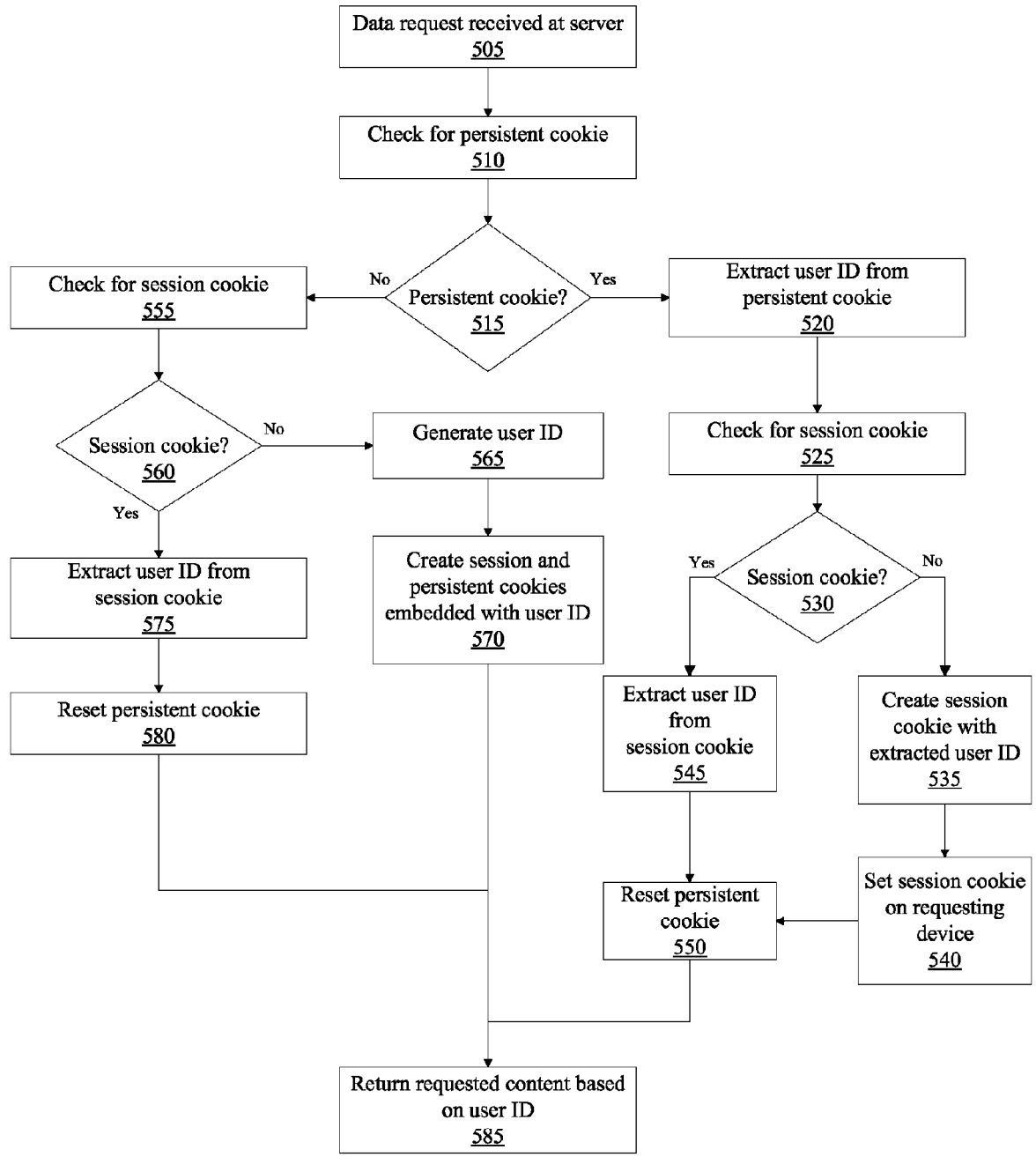
FIG. 5 illustrates an exemplary method embodiment in which a persistent cookie is reset responsive to a return of a session cookie.

FIG. 5 illustrates an exemplary method embodiment in which a persistent cookie is set in response to a web server receiving a session cookie in a user device request. A web server may receive a request for content from a user device 505 and, in response, may check whether the request contains a persistent cookie 510. The web server may, for example, use a naming convention to distinguish between persistent and session cookies relevant to the testing system. If the request contains a persistent cookie 515, the web server may extract the user ID embedded in the persistent cookie 520 and check whether the request contains a session cookie 525. If the request contains a session cookie 530, the user ID may be extracted from the session cookie 545 and used to reset the persistent cookie 550. The user ID may be used to return the proper web content 585 to the user device. According to embodiments, resetting the persistent cookie may include, but is not limited to, updating the expiration associated with the persistent cookie to a later time or embedding the user ID in a new persistent cookie, which is then stored on the user device.

If the request contains a persistent cookie but does not contain a session cookie 530, the web server may create a session cookie embedded with the extracted user ID 535, and the session cookie may be set and stored on the requesting user device 540. The web server may reset the persistent cookie 550, and the extracted user ID may be used to return the proper web content to the user device in response to the request for web content 585.

If a persistent cookie is not sent in the request 515, the web server may check whether a session cookie is present in the request 555. If a session cookie is not present 560, a user ID may be generated 565 and embedded into a persistent cookie and a session cookie 570, both of which may be returned, for example, in Set-Cookie response headers, and stored on the user device. The generated user ID 565, by being embedded in the persistent and session cookies 570, may be used to return the proper web data in response to the user device's request 585. If a session cookie is sent in the request 560, the embedded user ID may be extracted from the session cookie 575 and used to reset a persistent cookie on the user device 580. The user ID embedded in the persistent cookie 580 may be used to return the proper web data in response to the user device's request 585.

Two persistent cookies may be configured according to embodiments to associate the same user ID with a user upon each visit to a website. For example, a first persistent cookie may be embedded with the user ID and a second persistent cookie may be embedded with a value indicative of the expiration associated with the first persistent cookie. In one embodiment, the value in the second persistent cookie may be used to determine whether the first persistent cookie is nearing expiration, and, if so, the first persistent cookie may be reset.

Figure 6:
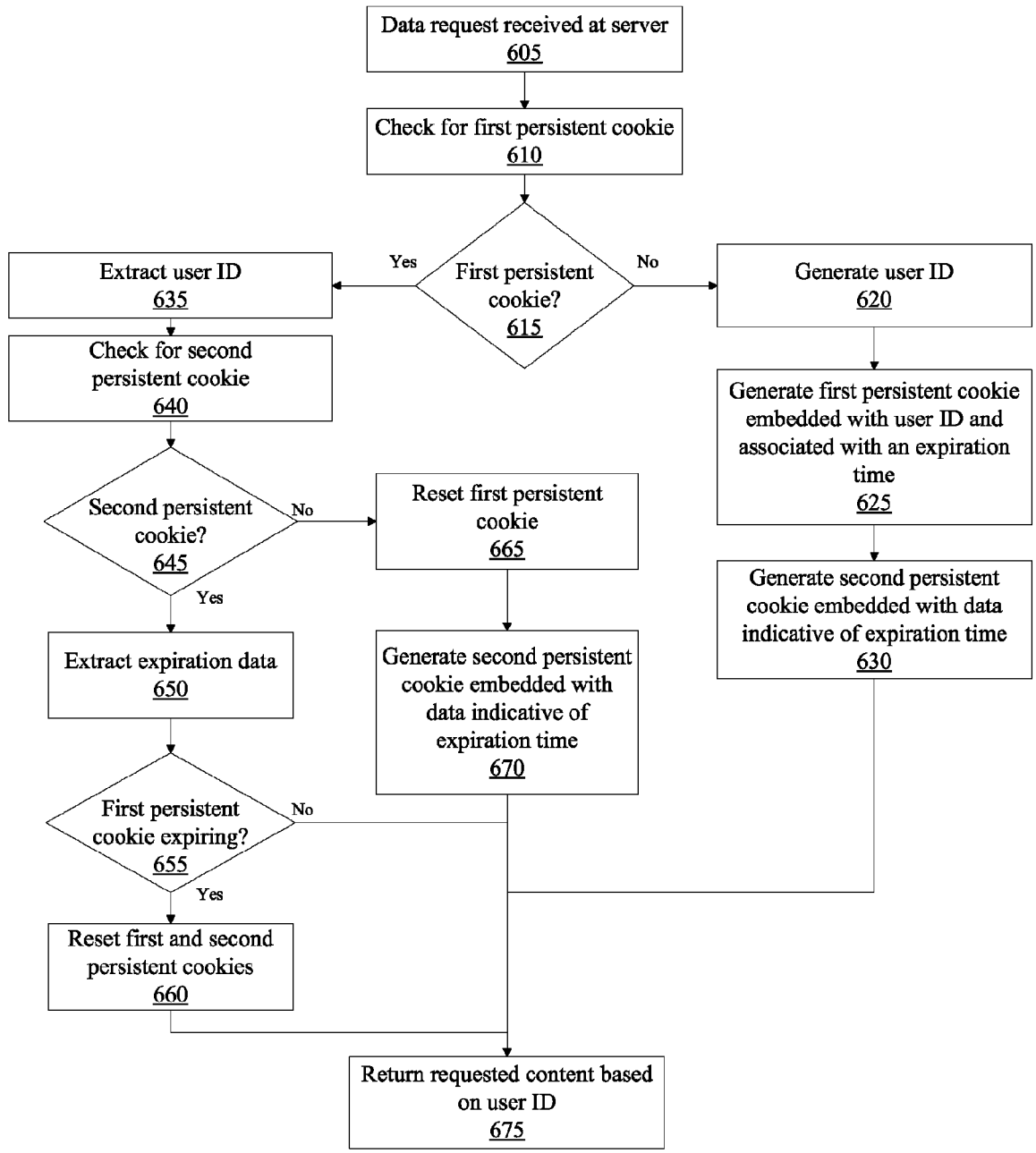
FIG. 6 illustrates an exemplary method embodiment in which two persistent cookies are used to consistently associate a user ID with a website visitor.

Referring to FIG. 6, therein is provided an exemplary method embodiment utilizing two persistent cookies to ensure that a user ID is consistently associated with a user. A request for web data from a user device may be received at a web server 605, and the web server may check the request headers for a first persistent cookie 610 (for example, using a naming convention). If the first persistent cookie is not sent in the request 615, the web server may generate a user ID 620, and may set a first persistent cookie embedded with the user ID and associated with an expiration time 625. Data indicative of the expiration time associated with the first persistent cookie may be embedded into a second persistent cookie set by the web server 630. For example, the data indicative of the expiration may be a date, time, or some combination thereof. The expiration time associated with the second persistent cookie may be set to be the same or later than the expiration time of the first persistent cookie, for example, such that the second persistent cookie will not expire prior to the first cookie. The generated user ID may be used to return the proper web data in response to the user device's request 675.

If the first persistent cookie is sent in the request 615, the embedded user ID may be extracted from the first persistent cookie 635 and the web server may check the request headers for the second persistent cookie 640. If the second persistent cookie is sent in the request 645, the embedded data indicative of the expiration of the first persistent cookie may be extracted from the second persistent cookie 650. The web server may determine whether the first persistent cookie is expiring based on the extracted data 655. The web server may determine whether the cookie is expiring in any number of ways. In a first non-limiting example, the web server may check whether the first persistent cookie expires within a set amount of time, such as within the following 48 hours. In a second non-limiting example, the data indicative of the expiration time may be checked against a deadline. For instance, if a test is scheduled to end on a certain date or time, the first persistent cookie may be determined to be expiring if it will expire prior to the date or time that the test is scheduled to end. If the first persistent cookie will expire after the time the test is scheduled to end, the first persistent cookie may be determined to not be expiring.

If it is determined that the first persistent cookie is expiring 655, the first persistent cookie may be reset 660. According to certain embodiments, the first persistent cookie may be reset by embedding the user ID into a new persistent cookie with a later expiration time and storing it on the user device. The second persistent cookie may also be reset 660. In one embodiment, resetting the second persistent cookie includes updating the embedded data indicative of the expiration of the first persistent cookie to be indicative of the new expiration time associated with the first persistent cookie. The expiration time associated with the second persistent cookie may also be changed to a later date. The expiration associated with the second persistent cookie may be changed to be the same time or later that the expiration time associated with the first persistent cookie, such that the second persistent cookie may not expire prior to the first persistent cookie. The user ID may be used to return web data to the user device in response to the user device's request 675.

If the user device does not send a second persistent cookie 645, the first persistent cookie may be reset and associated with a new expiration time 665. For example, the first persistent cookie may be reset with an expiration time equivalent to the end of the test, a specified amount of time such (e.g., 48 hours), and the like. Once the first persistent cookie has been reset, data indicative of the expiration time associated with the first persistent cookie can be embedded into a second persistent cookie set by the web server 670. The expiration time associated with the second persistent cookie may be set to be the same or after the expiration time associated with the first persistent cookie. Both of the persistent cookies may be stored on the user device. The system returns the corresponding web data to the user device in response to the user device's request based on the user ID 675.

Cookies may be configured according to embodiments to include cryptographic data, such as half of a cryptographic key pair, to ensure that users are not tampering with the cookies to 'discover' data or layouts that may be private, confidential, or otherwise sensitive. In this manner, the server may verify that cookies for a particular client are authentic and have not been tampered with, ensuring that only approved client devices participate in the appropriate tests.

Embodiments may be implemented in a manner that anonymizes the individual users, so that any information that is collected about the user is not associated with the user's identity. Rather, a user may be associated with, for example, a unique identifier, from which the user's true identity may not be determined.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those having ordinary skill in the art will appreciate that other embodiments may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope. Those skilled in the art will readily recognize various modifications and changes that may be made to the principles described herein without following the example embodiments and applications illustrated and described herein, and without departing from the spirit and scope.

What is claimed is:
1. A method comprising:
receiving a data request at a transceiver accessible by a server computing device, wherein, in response to receiving the data request, the server computing device is configured to:
accessing, by one or more processors coupled to the transceiver, a first value embedded in a first cookie associated with a first expiration time, wherein the first cookie is a persistent cookie;

set a second cookie embedded with a second value, wherein the second cookie is a session cookie or a persistent cookie; and resetting the first cookie responsive to receiving an indication that the first cookie is expiring, wherein to reset the first cookie comprises replacing the first cookie with a third cookie set with a value equal to the first value and a third expiration time later than the first expiration time.

2. The method of claim 1, wherein an indication that the first cookie is expiring is based on the absence of a request header containing the first cookie in the data request received at the server computing device.

3. The method of claim 1, wherein an indication that the first cookie is expiring is based on the first value embedded in the first cookie.

4. The method of claim 1, wherein the second cookie is a session cookie, and the server computing device accesses the second value from the second cookie responsive to an indication that the first cookie has expired.

5. The method of claim 4, wherein the first value equals the second value and the second value is embedded in the first cookie reset responsive to receiving an indication that the first cookie is expiring.

6. The method of claim 5, wherein resetting the first cookie comprises setting a new cookie embedded with the second value.

7. The method of claim 1, wherein the second cookie is a persistent cookie, and the server computing device is further configured to check the second value embedded in the second cookie, the second value being indicative of the first expiration associated with the first persistent cookie.

8. The method of claim 7, wherein the second value being indicative of the first expiration associated with the first persistent cookie is based upon the second value embedded in the second cookie.

9. The method of claim 8, wherein resetting the first cookie comprises setting the first expiration time associated with the first cookie to a value based on the second value embedded in the second cookie.

10. The method of claim 9, further comprising:
wherein resetting the first cookie further comprises resetting the second cookie;
wherein resetting the second cookie comprises:
embedding the second cookie with a second value indicative of an expiration time associated with the first cookie; and
changing a second expiration time associated with the second cookie to a later time.

11. The method of claim 10, wherein changing a second expiration time associated with the second cookie to a later time comprises setting a second expiration time later than the first expiration time associated with the first cookie.

12. The method of claim 1, wherein the data request comprises a Hypertext Transfer Protocol request.

13. A system comprising:
one or more transceivers;
one or more processors coupled to the one or more transceivers;
a non-transitory computer-readable storage medium accessible by the one or more processors, the non-transitory computer-readable storage medium storing instructions which, when executed by the one or more processors, cause the one or more processors to:
receive a data request at the one or more transceivers, wherein, in response to receiving the data request, the one or more processors are further configured to:

access a first value embedded in a first cookie associated with a first expiration time, wherein the first cookie is a persistent cookie;
set a second cookie embedded with a second value, wherein the second cookie is a session cookie or a persistent cookie; and
reset the first cookie responsive to receiving an indication that the first cookie is expiring, wherein to reset the first cookie comprises replacing the first cookie with a third cookie set with a value equal to the first value and a third expiration time later than the first expiration time.

14. The system of claim 13, wherein an indication that the first cookie is expiring is based on the absence of a request header containing the first cookie in the data request received at the server computing device.

15. The system of claim 13, wherein an indication that the first cookie is expiring is based on the first value embedded in the first cookie.

16. The system of claim 13, wherein the second cookie is a session cookie, and the one or more processors are further configured to access the second value from the second cookie responsive to an indication that the first cookie has expired.

17. The system of claim 16, wherein the first value equals the second value and the second value is embedded in the first cookie reset, responsive to receiving an indication that the first cookie is expiring.

18. The system of claim 13, wherein the second cookie is a persistent cookie, and the one or more processors are further configured to check the second value embedded in the second cookie, the second value being indicative of the first expiration associated with the first persistent cookie.

19. The system of claim 18, wherein the second value being indicative of the first expiration associated with the first persistent cookie is based upon the second value embedded in the second cookie.

20. The system of claim 19, wherein resetting the first cookie comprises setting the first expiration time associated with the first cookie to a value based one the second value embedded in the second cookie.

21. The system of claim 20, further comprising:
wherein resetting the first cookie further comprises resetting the second cookie;
wherein resetting the second cookie comprises:
embedding the second cookie with a second value indicative of an expiration time associated with the first cookie; and
changing a second expiration time associated with the second cookie to a later time.

22. The system of claim 21, wherein changing a second expiration time associated with the second cookie to a later time comprises setting a second expiration time later than the first expiration time associated with the first cookie.

23. The system of claim 13, wherein the data request comprises a Hypertext Transfer Protocol request.

24. At least one computer-readable non-transitory storage medium storing instructions which, when executed, cause a system to:
access a first value embedded in a first cookie responsive to receiving a data request, the first cookie being associated with a first expiration time, wherein the first cookie is a persistent cookie;
set a second cookie embedded with a second value, wherein the second cookie is a session cookie or a persistent cookie; and
reset the first cookie responsive to receiving an indication that the first cookie is expiring, wherein to reset the first cookie comprises replacing the first cookie with a third cookie set with a value equal to the first value and a third expiration time later than the first expiration time.

25. The computer-readable storage medium of claim 24, wherein an indication that the first cookie is expiring is based on the absence of a request header containing the first cookie in the data request received at the server computing device.

26. The computer-readable storage medium of claim 24, wherein an indication that the first cookie is expiring is based on the first value embedded in the first cookie.

27. The computer-readable storage medium of claim 24, wherein the second cookie is a session cookie, and the instructions, when executed, further cause the system to check the second value from the second cookie responsive to an indication that the first cookie has expired.

28. The computer-readable storage medium of claim 27, wherein the first value equals the second value and the second value is embedded in the first cookie reset, responsive to receiving an indication that the first cookie is expiring.

29. The computer-readable storage medium of claim 28, wherein resetting the first cookie comprises setting a new cookie embedded with the second value.

30. The computer-readable storage medium of claim 24, wherein the second cookie is a persistent cookie, and the instructions, when executed, further cause the system to retrieve the second value embedded in the second cookie, the second value being indicative of the first expiration associated with the first persistent cookie.

31. The computer-readable storage medium of claim 30, wherein the second value being indicative of the first expiration associated with the first persistent cookie is based on the second value embedded in the second cookie.

32. The computer-readable storage medium of claim 31, wherein resetting the first cookie comprises setting the first expiration time associated with the first cookie to a value based one the second value embedded in the second cookie.

33. The computer-readable storage medium of claim 32, further comprising:
wherein resetting the first cookie further comprises resetting the second cookie;
wherein resetting the second cookie comprises:
embedding the second cookie with a second value indicative of an expiration time associated with the first cookie; and
changing a second expiration time associated with the second cookie to a later time.

34. The computer-readable storage medium of claim 33, wherein changing a second expiration time associated with the second cookie to a later time comprises setting a second expiration time later than the first expiration time associated with the first cookie.

35. The computer-readable storage medium of claim 24, wherein the data request comprises a Hypertext Transfer Protocol request.

* * * * *